US012795186B2

(12) United States Patent
Nakatani

(10) Patent No.: US 12,795,186 B2
(45) Date of Patent: Nov. 10, 2026

(54) VIDEO DISTRIBUTION DEVICE, VIDEO DISTRIBUTION METHOD, AND RECORDING MEDIA

(71) Applicant: DWANGO Co., Ltd., Tokyo (JP)

(72) Inventor: Yushi Nakatani, Tokyo (JP)

(73) Assignee: DWANGO Co., Ltd. (JP)

( * ) Notice: Subject to any disclaimer, the term of this patent is extended or adjusted under 35 U.S.C. 154(b) by 0 days.

(21) Appl. No.: 19/349,369

(22) Filed: Oct. 3, 2025

(65) Prior Publication Data

US 2026/0032301 A1 Jan. 29, 2026

Related U.S. Application Data

(63) Continuation of application No. 18/012,649, filed as application No. PCT/JP2021/033859 on Sep. 15, 2021, now Pat. No. 12,464,177.

(30) Foreign Application Priority Data

Sep. 29, 2020 (JP) ................................ 2020-163432
Jul. 28, 2021 (JP) ................................ 2021-123690

(51) Int. Cl.
*H04N 21/25* (2011.01)
*H04N 21/2187* (2011.01)
*H04N 21/258* (2011.01)

(52) U.S. Cl.
CPC ....... *H04N 21/251* (2013.01); *H04N 21/2187* (2013.01); *H04N 21/25891* (2013.01)

(58) Field of Classification Search
None
See application file for complete search history.

(56) References Cited

U.S. PATENT DOCUMENTS 5,465,113 A 11/1995 Gilboy
7,797,714 B1 9/2010 Nagasaka et al.
(Continued)

FOREIGN PATENT DOCUMENTS

CN 105872837 A 8/2016
CN 107172499 A 9/2017
(Continued)

OTHER PUBLICATIONS

JP2021184199 Notice of Reason for Refusal dated Aug. 27, 2024, 6 pgs.

(Continued)

*Primary Examiner* — William J Kim
(74) *Attorney, Agent, or Firm* — Bracewell LLP; Doug Stewart; Patrick J. Connolly

(57) ABSTRACT

To provide a service enabling communication between distributors that distribute video content and viewers thereof and that increases excitement in the video content. A video distribution device according to an Embodiment provides: a first acquiring part for acquiring real-time video data supplied by a distributor terminal and the user identification information of a distributor; a second acquiring part for acquiring a distribution request from a viewer terminal and the user identification information of the viewer; a third acquiring part for acquiring user identification information from a user terminal, possibly including the distributor terminal and the viewer terminal and candidate information of a favorite tag for classifying distributors or viewers by interests or favorited items; and a user information managing part for associating the favorite tag candidate information with the user identification information acquired by the third acquiring part as the favorite tag with reference to the external dictionary data when the favorite tag candidate (Continued)

information is included in the dictionary data and storing this in a database.

12 Claims, 9 Drawing Sheets

(56) References Cited

U.S. PATENT DOCUMENTS

| | | | | |
|---|---|---|---|---|
| 10,897,637 | B1 | 1/2021 | Pham et al. | |
| 2002/0088010 | A1 | 7/2002 | Dudkiewicz et al. | |
| 2002/0104088 | A1 | 8/2002 | Mcgee et al. | |
| 2007/0011203 | A1* | 1/2007 | Tsunoda | H04N 21/4532 |
| 2007/0157220 | A1 | 7/2007 | Cordray et al. | |
| 2007/0211158 | A1 | 9/2007 | Icho et al. | |
| 2007/0277205 | A1 | 11/2007 | Grannan | |
| 2008/0060008 | A1* | 3/2008 | Wang | H04N 21/4828 725/39 |
| 2010/0251290 | A1 | 9/2010 | Kodialam et al. | |
| 2012/0066355 | A1 | 3/2012 | Tiwari et al. | |
| 2014/0196068 | A1 | 7/2014 | Begeja et al. | |
| 2014/0359444 | A1 | 12/2014 | Greenberg-Sanders et al. | |
| 2015/0298010 | A1 | 10/2015 | Trombetta et al. | |
| 2016/0117595 | A1 | 4/2016 | Zhang et al. | |
| 2016/0277802 | A1 | 9/2016 | Bernstein et al. | |
| 2017/0064357 | A1 | 3/2017 | Jabara et al. | |
| 2017/0064366 | A1 | 3/2017 | Jabara | |
| 2017/0134776 | A1 | 5/2017 | Ranjeet et al. | |
| 2017/0238055 | A1 | 8/2017 | Chang et al. | |
| 2017/0264919 | A1 | 9/2017 | Amine | |
| 2017/0366854 | A1 | 12/2017 | Puntambekar et al. | |
| 2018/0014077 | A1 | 1/2018 | Hou et al. | |
| 2018/0146217 | A1 | 5/2018 | Kedenburg, III | |
| 2018/0227632 | A1 | 8/2018 | Rubin et al. | |
| 2019/0182554 | A1 | 6/2019 | Schupak et al. | |
| 2019/0261039 | A1 | 8/2019 | Woschank et al. | |
| 2019/0342626 | A1 | 11/2019 | Hernandez | |
| 2019/0373319 | A1 | 12/2019 | Greenberger et al. | |
| 2020/0007934 | A1 | 1/2020 | Ortiz et al. | |
| 2020/0037009 | A1 | 1/2020 | Shapira et al. | |
| 2023/0043174 | A1 | 2/2023 | Zhang et al. | |

FOREIGN PATENT DOCUMENTS

| | | | |
|---|---|---|---|
| CN | 107959865 | A | 4/2018 |
| CN | 108021672 | A | 5/2018 |
| CN | 108322829 | A | 7/2018 |
| CN | 108519991 | A | 9/2018 |
| CN | 108829771 | A | 11/2018 |
| CN | 108900923 | A | 11/2018 |
| CN | 109274979 | A | 1/2019 |
| CN | 109729377 | A | 5/2019 |
| CN | 109905723 | A | 6/2019 |
| CN | 110087119 | A | 8/2019 |
| CN | 110209692 | A | 9/2019 |
| CN | 110876088 | A | 3/2020 |
| CN | 112364202 | A | 2/2021 |
| JP | 2004040457 | A | 2/2004 |
| JP | 2004164653 | A | 6/2004 |
| JP | 2005354642 | A | 12/2005 |
| JP | 2008099021 | A | 4/2008 |
| JP | 2010288024 | A | 12/2010 |
| JP | 2011223571 | A | 11/2011 |
| JP | 2014007659 | A | 1/2014 |
| JP | 2015184949 | A | 10/2015 |
| JP | 2016134859 | A | 7/2016 |
| JP | 2019097159 | A | 6/2019 |
| JP | 2019164617 | A | 9/2019 |
| JP | 2019197159 | A | 11/2019 |
| JP | 6978630 | B1 | 12/2021 |
| WO | 2017035076 | A1 | 3/2017 |
| WO | 2021120799 | A1 | 6/2021 |

OTHER PUBLICATIONS

CN202180023318.X Office Action dated May 31, 2023, 34 pgs.

CN202180023318.X Second Office Action dated Nov. 23, 2023, 18 pgs.

PCT/JP2021/033859 International Search Report dated Dec. 7, 2021, 3 pgs.

JP2024193429 Japanese Office Action dated Sep. 30, 2025, 6 pgs.

* cited by examiner

VIDEO DISTRIBUTION DEVICE, VIDEO DISTRIBUTION METHOD, AND RECORDING MEDIA

CROSS-REFERENCE TO RELATED APPLICATIONS

This application is a continuation of U.S. patent application Ser. No. 18/012,649.

TECHNICAL FIELD

The present invention relates to a video distribution device, a video distribution method, and recording media.

BACKGROUND TECHNOLOGY

In recent years, it has become possible for viewers to select from among a large amount of video content in a prepared environment in which individuals can easily distribute video content. When a distributor distributes video content in real-time (live broadcast), for example, a viewer can post a comment, and this enables communication between themselves and the distributor, the distributor to respond according to reactions of the viewer, and a realistic viewer experience unique to live broadcasts.

In particular, preferences in common between distributors and viewers can be anticipated to enable active communication and raise excitement for video content. However, depending on the viewer, searching for video content in line with personal preferences from among an enormous amount of distributed video content is a time-consuming process.

As such, conventionally, art for calculating a recommendation value for each video user based on video attribute data according to video content and the attribute data of a user of a viewer terminal and the like has been proposed (for example, see Patent Document 1).

In addition, art has been proposed for extracting content tags giving features of each video scene, extracting topic tags relating respectively to groups classified by video scenes based on the content tags, creating user profiles that indicate user preferences based on user viewing operations, and from the video data, creating suggestion information for suggesting video scenes that align with the user profile based on the content tags and topic tags (for example, see Patent Document 2).

RELATED ART DOCUMENTS

Patent Documents

Patent Document 1: JP 2016-134859 A

Patent Document 2: JP 2010-288024 A

SUMMARY OF THE INVENTION

Problem to be Solved by the Invention

In the case of distributed video content, even if viewers are able to find video content that interests them, active communication may not take place if their video content preferences do not align with those of distributors.

In light of the circumstances described above, an object of the present invention is to provide a video distribution device, a video distribution method, and recording media for providing a service that enables active communication between viewers and distributors and increases excitement for video content.

Means to Solve the Problem

A video distribution device according to a first aspect of the present invention includes:

a first acquiring part for acquiring real-time video data supplied from a distributor terminal and the user identification information of a distributor;

a second acquiring part for acquiring a distribution request from a viewer terminal and the user identification information of the viewer;

a third acquiring part for acquiring user identification information from a user terminal, possibly including the distributor terminal and the viewer terminal, and candidate information of a favorite tag for classifying distributors or viewers by interests or favorited items; and a user information managing part that references external dictionary data when favorite tag candidate information is included in the dictionary data, associates the tag candidate information with the user identification information acquired by the third acquiring part as the favorite tag and stores this in a database to suppress mismatching of favorite tags registered for the distributor and the viewer.

A video distribution device according to a second aspect of the present invention includes:

a generating part for acquiring distributor favorite tag information associated with the distributor user identification information via the user information managing part and generating video data for distribution using the acquired favorite tag information and the real time video data; and a distributing part for distributing the video data for distribution corresponding to the distribution request to the viewer terminal.

A video distribution device according to a third aspect of the present invention, wherein the generating part acquires the favorite tag information of the viewer associated with the user identification information of the viewer via the user information managing part, and when the acquired favorite tag of the viewer is in common with the favorite tag information of the distributor, generates video data for distribution so as to include notifying means providing notification that the viewer having a shared preference tag has started viewing.

A video distribution device according to a fourth aspect of the present invention, wherein the second acquiring part can further acquire input information including information of a communication image selected by operation of the viewer terminal, and the generating part generates video data for distribution further using the communication image data for performing a prescribed action on a display screen.

A video distribution device according to a fifth aspect of the present invention, further includes:

a recommended distributor selecting part for selecting one or a plurality of distributors as a recommended distributor based on the favorite tag information associated with the user identification information of the viewer and stored; and a recommendation transmitting part for transmitting information of the recommended distributor selected by the recommended distributor selecting part to the viewer terminal.

A video distribution device according to a sixth aspect of the present invention, wherein the recommended distributor selecting part selects the recommended distributor according to a matching aspect of the favorite tag information associated with the user identification information of the viewer and stored and information with the favorite tag associated with the user identification information of the distributor and stored.

A video distribution device according to a seventh aspect of the present invention, wherein the recommended distributor selecting part selects the recommended distributor based on the favorite tag associated with the user identification information of the distributor during a live broadcast and stored.

A video distribution method according to an eighth aspect of the present invention, includes:

- a step of acquiring user identification information from a user terminal including a distributor terminal and a viewer terminal and candidate information of a favorite tag for classifying distributors or viewers by interests or favorited items;
- a step of storing favorite tag candidate information in a database associated with user identification information as the favorite tag with reference to external dictionary data when the favorite tag candidate information is included in the dictionary data in order to suppress mismatching of favorite tags registered to distributors or viewers; and a step of acquiring real time video data supplied from the distributor terminal and the user identification information of the distributor.

A computer-readable recording media for recording on a computer according to a ninth aspect of the present invention, a video distribution program that executes:

- a function for acquiring user identification information from a user terminal including a distributor terminal and a viewer terminal and candidate information of a favorite tag for classifying distributors or viewers by interests or favorited items;
- a function for storing favorite tag candidate information in a database associated with user identification information as the favorite tag with reference to external dictionary data when the favorite tag candidate information is included in the dictionary data in order to suppress mismatching of favorite tags registered to distributors or viewers; and
- a function for acquiring real-time video data supplied from the distributor terminal and the user identification information of the distributor.

Effect of the Invention

According to the present invention, a video distribution device, a video distribution method, and recording media for providing a service that enables active communication between viewers and distributors and increases excitement for video content can be provided.

EMBODIMENTS OF THE INVENTION

Embodiment 1

A video distribution device, a video distribution method, and recording media according to Embodiment 1 are described below with reference to the drawings.

Figure 1:
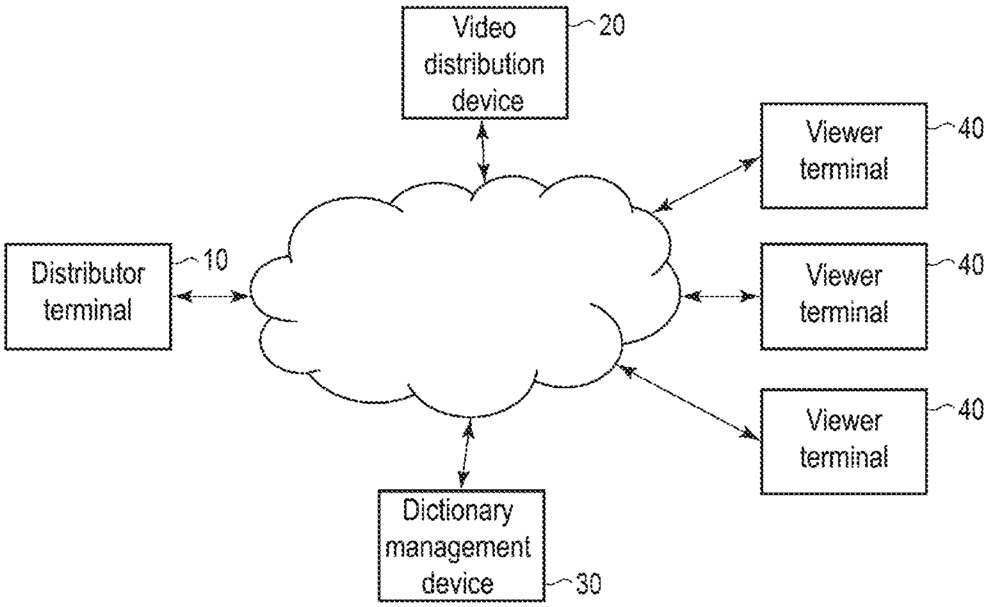
FIG. 1 is a diagram illustrating a schematic configuration of a video content distribution system including a video distribution device according to Embodiment 1.

FIG. 1 is a diagram illustrating a schematic configuration of a video content distribution system including the video distribution device according to Embodiment 1.

The video distribution system is provided with a distributor terminal 10, a video distribution device 20, and a dictionary management device 30. The video distribution device 20 can be connected for enabling communication to the distributor terminal 10, the dictionary management device 30, and a viewer terminal 40 via a network. Note that three viewer terminals 40 are displayed in FIG. 1; however, the number of the viewer terminals 40 is not limited to the number illustrated, and may even be zero.

The distributor terminal 10 may be an electronic device such as a computer that can be connected to a video source such as, for example, a video camera; examples include: a television receiver (including internet television), PC (Personal Computer), mobile terminal (for example, tablet, smartphone, laptop, feature phone, portable gaming equipment, digital music player, e-book reader, and the like), VR (Virtual Reality) terminal, AR (Augmented Reality) terminal, and the like, but the terminal is not limited thereto. The distributor terminal 10 includes at least one processor and a storing part that stores programs executed by the processor and is configured to enable implementation of various functions via software or a combination of software and hardware.

The viewer terminal 40 may be an electronic device such as a computer; examples include: a television receiver (including internet television), PC (Personal Computer), mobile terminal (for example, tablet, smartphone, laptop, feature phone, portable gaming equipment, digital music player, e-book reader, and the like), VR (Virtual Reality) terminal, AR (Augmented Reality) terminal, and the like, but the terminal is not limited thereto.

The viewer terminal 40 includes at least one processor and memory on which a program executed by the processor is recorded and is configured to enable implementation of various functions via software or a combination of software and hardware.

The viewer terminal 40 is capable of receiving content data such as video data or audio data from the video distribution device 20 and presenting content to the viewer by display means, audio means, or the like (not shown).

The dictionary management device 30 is a computer provided with, for example, at least one processor, a memory on which a program to be executed by the processor is recorded, and a dictionary data storing part for compiling dictionary data, and is configured to enable implementation of various functions via software or a combination of software and hardware.

The dictionary management device 30 can associate a word input through the network with a definition, meaning, source, or the like of the word and store this in the dictionary data storing part. The dictionary management device 30 can generate a webpage by which a user can search dictionary data stored in the dictionary data storing part for any word and upload the webpage to the network. The user can access the webpage and search for a desired word to find the definition, meaning, source, or the like thereof, as well as alter and revise the definition, meaning, or location.

Figure 2:
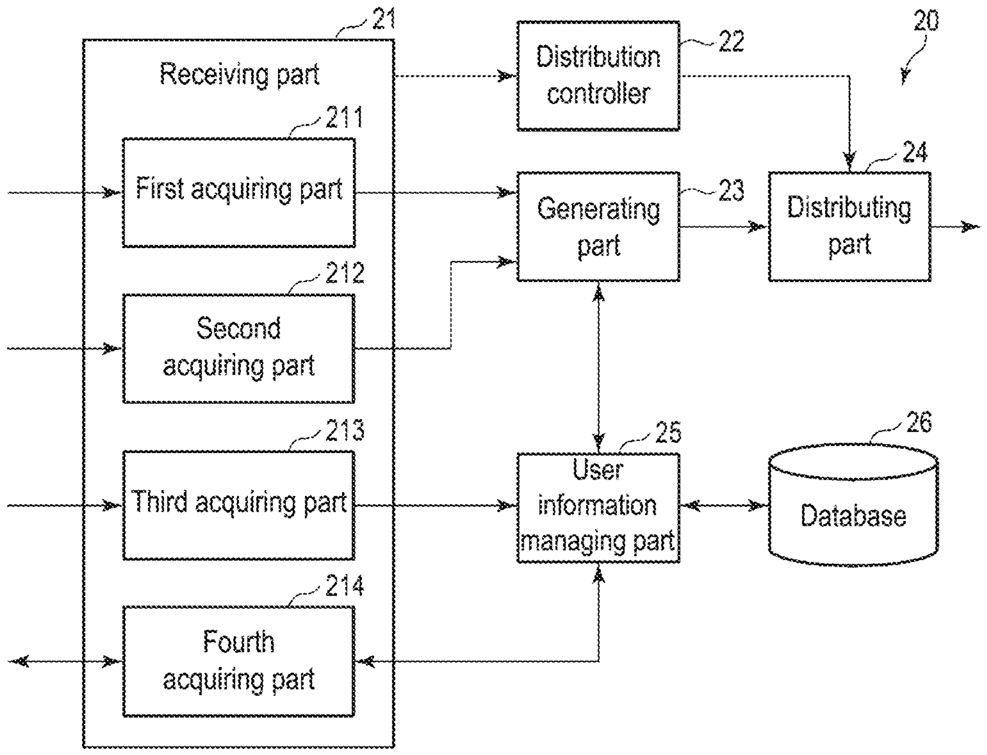
FIG. 2 is a block diagram schematically illustrating a configuration example of the video distribution device according to Embodiment 1.

FIG. 2 is a block diagram schematically illustrating a configuration example of the video distribution device according to Embodiment 1.

The video distribution device 20 is provided with a receiving part 21 including a first acquiring part 211, a second acquiring part 212, a third acquiring part 213, and a fourth acquiring part 214; a distribution controller 22; a generating part 23; a distributing part 24; a user information managing part 25; and a database 26.

The video distribution device 20 may be provided with, for example, a processor for executing a program that implements a function of the above configuration and memory on which the program is stored. The processor is typically a CPU (Central Processing Unit) and/or GPU (Graphics Processing Unit), but may also be, for example, a microcontroller, FPGA (Field Programmable Gate Array), DSP (Digital Signal Processor), or the like. In addition, the memory temporarily stores the program executed by the processor, data used by this processor, and the like, for implementing operation of the video distribution device.

Furthermore, the video distribution device 20 may be further provided with a communicating part (not shown) that can connect to the network and a data storing part (not shown) for compiling a large amount of data. The data storing part may include the database 26. The data storing part may be built into the video distribution device 20 or attached externally to the video distribution device 20. The data storing part may include non-volatile storage media such as a HDD (Hard Disk Drive), SSD (Solid State Drive), and the like.

The receiving part 21 can communicate with the distributor terminal 10, dictionary management device 30, and viewer terminal 40 through the network, and may contain the first acquiring part 211 and the second acquiring part 212. For example, the receiving part 21 receives video data from the distributor terminal 10 and receives distribution requests from the viewer terminal 40. The receiving part 21 transmits a distribution request received from the viewer terminal 40 to the distribution controller 22 and the generating part 23. The transmission request from the viewer terminal 40 may include identification information (user identification information) of the viewer or the viewer terminal 40 and video content identification information.

The first acquiring part 211 can receive video data supplied from the distributor terminal 10 through the network. Specifically, the first acquiring part 211 receives video data for real-time distribution transmitted sequentially by the distributor terminal 10. The first acquiring part 211 transmits the received video data to the generating part 23.

The second acquiring part 212 can receive user identification information of the viewer, a distribution request for video content, and input information corresponding to the video content from the viewer terminal 40. Specifically, input information received by the second acquiring part 212 through the viewer terminal 40 may include identification information for video content being viewed, information (identification information and the like) related to a comment input by a viewer or an emote image (communication image) EM posted on a content display screen, operation information (length of operation time, pressure during operation, and the like) of the viewer terminal 40 by the viewer, or the like. The second acquiring part 212 sends the received input information to the generating part 23. The second acquiring part 212 is capable of acquiring viewer terminal 40 input information and associating this information with the user identification information of the viewer (or viewer terminal 40).

Note that the emote image EM is an image for expressing a feeling or intention of the viewer by means of text, color, or the like which is posted on the content display screen based on operation by the viewer, being means for easy communication between the viewer and the distributor.

The third acquiring part 213 can receive, from a user terminal (the distributor terminal 10 and the viewer terminal 40), a favorite tag registration request, information (including favorite tag candidate information) input by the user (viewer and distributor), and identification information of the user or the user terminal (user identification information). The third acquiring part 213 transmits an acquired favorite tag registration request, user identification information, and information input by the user into the user information managing part 25.

The fourth acquiring part 214 can receive information (including favorite tag candidate information) input by the user from the user information managing part 25. Furthermore, the fourth acquiring part 214 can reference dictionary data in the dictionary management device 30 and receive a word registrable as a favorite tag and dictionary information including a definition of the word based on the information input by the user. The fourth acquiring part 214 transmits a registrable word and dictionary information of the word, which are acquired from the dictionary management device 30, to the user information managing part 25.

At least the user identification information and information of one or a plurality of preference tags associated with the user identification information is registered in the database 26. Moreover, one or a plurality of emote images (communication images) associated with a favorite tag is stored in the database. Note that emote images may be associated with all of the favorite tags, emote images may be associated with only a portion of the favorite tags, or a common emote image may be associated with a plurality of the favorite tags.

The favorite tag is, for example, a tag attached to the user and a label for classifying the user according to interest or a favorited item. The emote image is an image for expressing a feeling or intention of the viewer by means of text, color, or the like which is posted on the content display screen based on operation by the viewer, being means for easy communication between the viewer and the distributor.

The database 26 may, for example, be built into the video distribution device 20 or attached externally to the video distribution device 20. The database 26 may include non-volatile storage media such as a HDD (Hard Disk Drive), SSD (Solid State Drive), and the like.

The user information managing part 25 can reference external dictionary data and store the candidate information of the favorite tag in the database 26 as a favorite tag associated with the user identification information when candidate information of a favorite tag acquired from the user terminal is included in the dictionary data.

The user information managing part 25 can present dialogue for favorite tag registration to guide the user to register a favorite tag, for example, when the user has accessed a video distribution site or logged in to the video distribution site, when the user registers as a member on the video distribution site, requests editing of favorite tag registration information, or the like. Note that the user information managing part 25 can be configured to enable communication with the third acquiring part 213 or a user terminal in which handling is performed through a communicating part (not shown).

Figure 3:
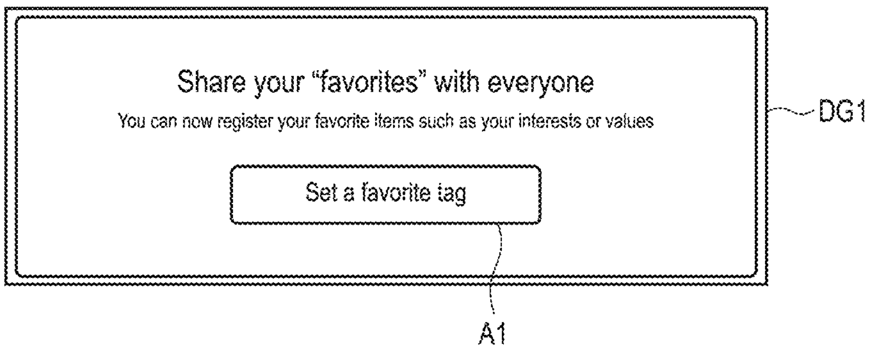
FIG. 3 is a diagram schematically illustrating an example of dialogue presented to a user upon registration of a favorite tag according to Embodiment 1.
Figure 4:
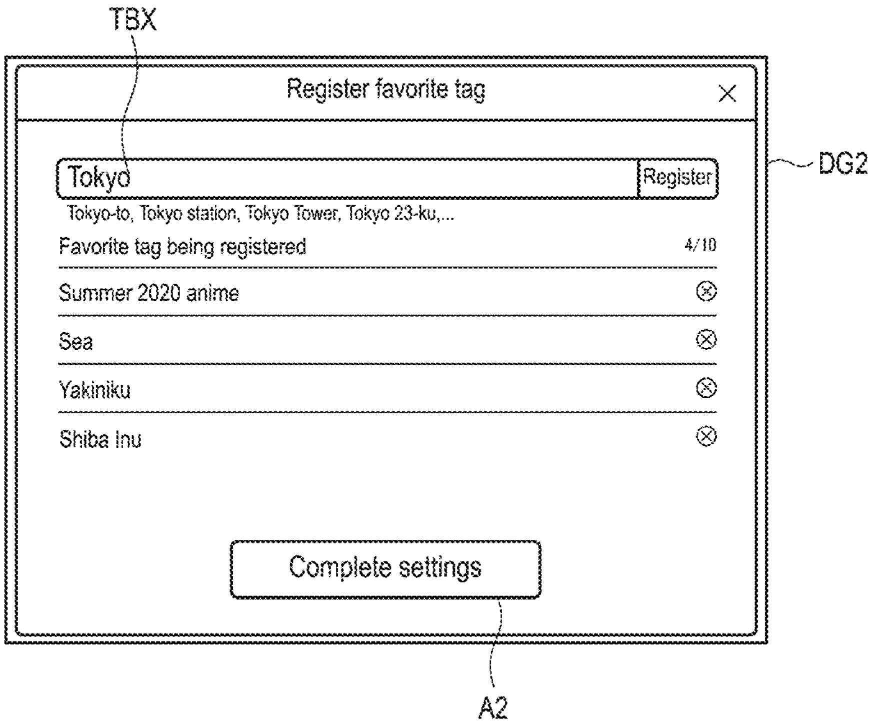
FIG. 4 is a diagram schematically illustrating an example of dialogue presented to a user upon registration of a favorite tag according to Embodiment 1.

FIG. 3 and FIG. 4 are diagrams schematically illustrating an example of dialogue presented to the user during favorite tag registration.

The user information managing part 25 presents, for example, the dialogue DG1 illustrated in FIG. 3 and prompts the user to register a favorite tag. When registration of the favorite tag is initiated, the user selects by clicking or tapping with their finger a button A1 on which "Set favorite tag" is written and can proceed to editing registration or the like of the favorite tag.

In addition, the user information managing part 25 further presents, for example, dialogue DG2 illustrated in FIG. 4 to the user who selected the button A1, which allows the user to register a favorite tag. The user information managing part 25 receives information input by the user from the third acquiring part 213 and transmits the received input information through the fourth acquiring part 214 to the dictionary management device 30. The dictionary management device 30 searches for words containing the information input by the user from among words registered in the dictionary data and transmits a search result to the video distribution device 20. The user information managing part 25 receives the search result word from the dictionary management device 30 and can display such to the user in, for example, the dialogue DG2.

The dialogue DG2 includes, for example, a text box TBX in which a word the user desires to register as a favorite tag is input, a list of favorite tags previously registered by the user, and a button A2 on which "Complete setup" is noted.

For example, if the user inputs "Tokyo" in the text box TBX, the user information managing part 25 can acquire words containing "Tokyo" from among words recorded in the dictionary in the dictionary management device 30 and display words that can be registered as a favorite tag below the text box TBX. FIG. 4 displays, as examples of words that can be registered as a favorite tag, "Tokyo-to", "Tokyo station", "Tokyo Tower", "Tokyo 23-ku", . . . . The user can reference a presented word and input a personally registered favorite tag.

Note that, in the video distribution device 20 according to the present Embodiment, the words that can be registered as the favorite tag are limited to words registered in the dictionary data of the dictionary management device 30. That is, the user information managing part is configured such that candidate information of the favorite tag is stored as a favorite tag in the database 26 in association with the user identification information only when candidate information of the favorite tag for which registration is requested by the user terminal is included in the external dictionary data.

For example, in the video distribution device 20 according to the present Embodiment, the user information managing part 25 may be configured such that, for example, a "Register" button provided at the end on the text box TBX is activated when a word input to the text box TBX is a word registered in the dictionary. Limiting the words that can be registered as a favorite tag suppresses mismatches in favorite tags registered by users having an interest or preference in common and enables the user to be more efficiently classified according to their interests or preferences.

Note that in the case of a word similar to one contained in the dictionary data, the user information managing part 25 may, for example, prioritize words registered as a favorite tag by a large number of users and present these on the user terminal. In this manner, variations in registered favorite tags can be further suppressed.

Moreover, the user information managing part 25 may, for example, reference favorite tag information previously recorded by the user, viewing history of the user, a ranking of most recently registered favorite tags, and the like, and present favorite tags which seem to match preferences of the user for recommendation. In this case as well, the user information managing part 25 preferably presents, from among the words registered in the dictionary of the dictionary management device 30, recommendations to the user as favorite tags.

For example, if the user selects (perform a registration request) by clicking or tapping a "Register" button provided at the end of the text box TBX, the user information managing part 25 can acquire text information input in the text box TBX and associate the acquired text information with the user identification information as favorite tag information and register the information in the database 26.

In addition, a favorite tag previously registered by the user can be deleted using dialogue DG2. In the example illustrated in FIG. 4, up to ten favorite tags can be registered, and a user whose interests or preferences has changed can delete a previously registered favorite tag and edit a favorite tag of theirs by registering a new favorite tag.

For example, when deletion means provided at the end of a favorite tag display previously registered by the user (region displayed as "x") is selected by being clicked or tapped, the user information managing part 25 can access the database 26 and delete a corresponding favorite tag associated with the user identification information from the database 26.

When the user performs a selection by clicking or tapping the button A2 on which "Complete setup" is written in the dialogue DG2, the user information managing part 25 ends a favorite tag registration process.

Furthermore, the user information managing part 25 can read from the database 26 favorite tag information associated with the user identification information of the distributor and favorite tag information associated with the user identification information of the viewer in response to a request from the generating part 23 and provide such to the generating part 23.

The distribution controller 22 controls real-time transmission operations of the video data. The distribution controller 22 can receive, from the second acquiring part 212, a distribution request via the viewer terminal 40 and control the distributing part 24 such that video data is distributed to the viewer terminal 40. Furthermore, the distribution controller 22 includes, for example, a clock (not shown), and may compare time information obtained from the clock with a time frame assigned to a real-time distribution of the video data and manage a start and end of real-time transmission of the video data. Moreover, the distribution controller 22 may manage starting and ending real time distribution by starting distribution of video content in real time based on receiving of video data for distribution and ending distribution of video content based on video data for distribution stopping.

The generating part 23 receives real-time video data from the first acquiring part 211 and information input by the viewer from the second acquiring part 212. The real-time video data is, for example, associated with tag information attached to video content and the user identification information of the distributor. In addition to the real-time video data, the generating part 23 can receive tag information associated with the real-time video data or user identification information of the distributor.

The generating part 23 can generate video data for distribution with comments and emote images based on information input from the viewer terminal 40, for example, superimposed on the real time video data. The generating part 23 may, for example, combine comments and emote images EM in the real-time video data using a well-known technique such as alpha blending and picture-in-picture. In addition, the generating part 23 may generate video data for distribution such that comments and emote images EM can be combined by the viewer terminal 40 in the real-time video data. The generating part 23 sends the generated video data for distribution to the distributing part 24.

The generating part 23 may, for example, resize a portion or all of a playback video screen for real-time video data or trim a portion of the screen and combine the portion with input information, or may combine the portion with evaluation information such that the portion of the playback video screen for the real-time video data is exposed and the rest is hidden. In addition, the generating part 23 can exchange and distribute a plurality of video data for distribution in response to a distribution request from the viewer terminal, and therefore may generate and distribute a plurality of video data for distribution having different display images to the distributing part 24.

The generating part 23 can also generate a recent page for presenting a plurality of video content currently being distributed in real-time to the viewer.

Figure 5:
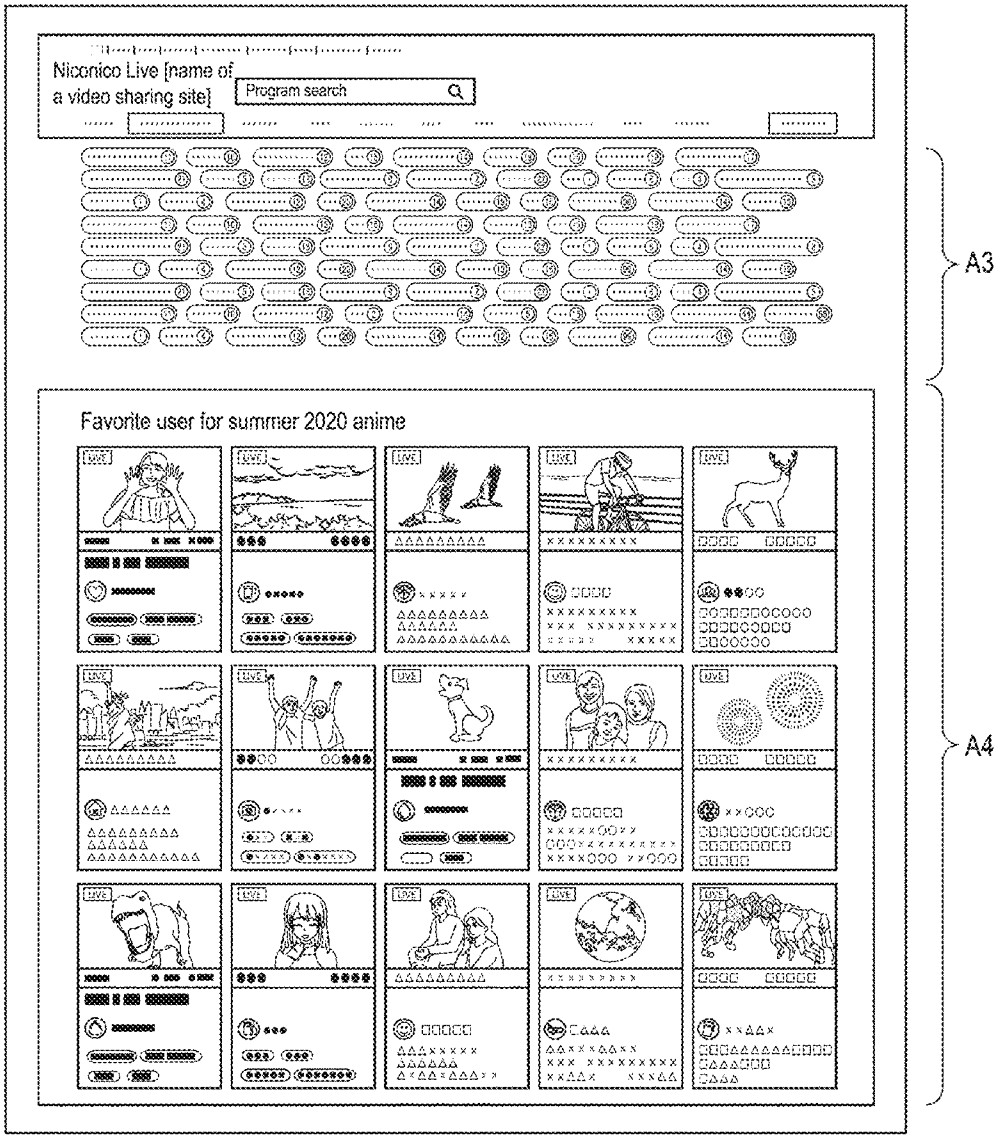
FIG. 5 is a diagram schematically illustrating an example of a recent page presenting video content distributed in real-time according to Embodiment 1.

FIG. 5 is a diagram schematically illustrating an example of the recent page presenting the video content distributed in real-time.

The recent page illustrated in FIG. 5 includes an area A3 in which a plurality of favorite tags are presented and an area A4 in which a plurality of video content distributed by a distributor for which a selected favorite tag is registered is distributed in real-time.

The generating part 23 acquires favorite tag information attached to the distributor for the video content distributed in real-time from the user information managing part 25 and presents a list of favorite tags in the area A3. For example, in area A3, a favorite tag attached to a large number (for example, a prescribed threshold value or more) of real-time distributors may be presented, a favorite tag having a large number of registrants may be presented, or a favorite tag aligning with the interests or preferences of the viewer listed in the recent page may be presented.

In area A4, the generating part 23 presents, for example, video content information distributed in real-time by the distributor to which the favorite tag selected by the viewer from among the favorite tags presented in the area A3 is attached. The video content information presented in the area A4 may include, for example, a thumbnail of the video content, a title of the video content, the name of a distributor, the number of viewers, number of followers, a favorite tag registered by the distributor, and the like. FIG. 5 illustrates a display example of when a "summer 2020 anime" favorite tag is selected as an example.

The generating part 23 periodically updates the generated recent page and uploads the update onto the network. The viewer terminal 40 can access the recent page via the network. The viewer selects a favorite tag having their personal interest from within the area A3, browses the plurality of video content information presented in the area A4, and searches for video content from a distributor that aligns with their interests or preferences.

In addition, the generating part 23 can generate video data for distribution such that a watch page is generated for each distributor. The watch page generated for each distributor can include video content information currently being distributed by a distributor, video content information previously distributed by the distributor, favorite tag information registered by the distributor, and input information such as a comment input by a viewer with regard to video content.

Figure 6:
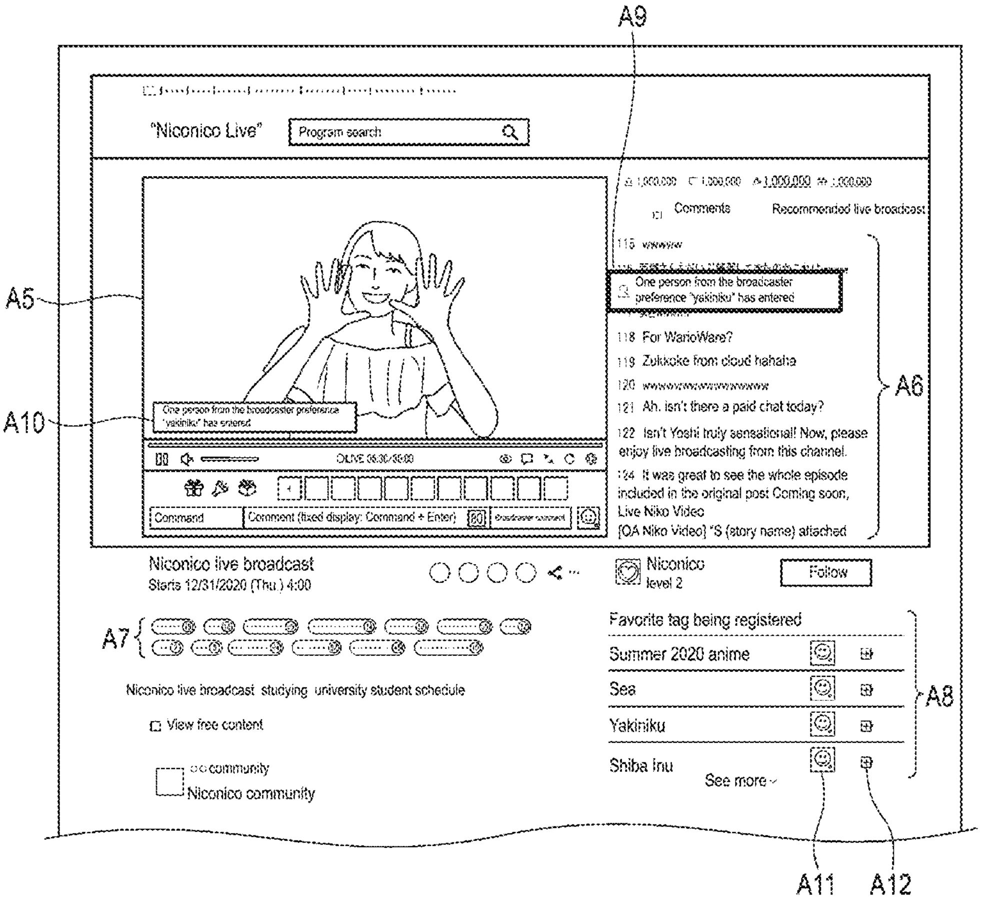
FIG. 6 is a diagram schematically illustrating an example of a watch page generated for each distributor according to Embodiment 1.

FIG. 6 is a diagram schematically illustrating an example of the watch page generated for each distributor.

The generating part 23 can display, for example, distributor registration information along with the watch page when a viewer views video content. In the example illustrated in FIG. 6, the watch page includes at least an area A5 displaying video content, an area A6 displaying content input by the viewer, an area A7 displaying a tag attached to the video content, and an area A8 displaying a favorite tag attached to the distributor.

The generating part 23 receives real-time video data from the first acquiring part 211 and user identification information of a distributor associated with real-time video data. Furthermore, the generating part 23 receives information input by the viewer from the second acquiring part 212 and user identification information of the viewer associated with the input information.

The generating part 23 can acquire, using the user identification information of the distributor, favorite tag information associated with the user identification information of the distributor via the user information managing part 25, and an emote image associated with a favorite tag of the distributor. In addition, the generating part 23 can acquire, using the user identification information of the viewer, favorite tag information associated with the user identification information of the viewer via the user information managing part 25.

The generating part 23 displays, using the favorite tag information associated with the user identification information of the distributor, the favorite tag information in the area A8 of the watch page, input means A11 of an emote image corresponding to the favorite tag, and input means A12 of a request for video content of the favorite tag. By clicking or tapping the input means A12, the viewer can notify the distributor of a video content request relating to a corresponding favorite tag. When the input means A11 is clicked or tapped by the viewer, the generating part 23 displays a window displaying the emote image corresponding to the favorite tag near the area A8.

Figure 7:
FIG. 7 is a diagram schematically illustrating an example of a window displaying emote images corresponding to the favorite tags according to Embodiment 1.

FIG. 7 is a diagram schematically illustrating an example of the window displaying the emote image corresponding to the favorite tag.

Here, an example of an emote image EM corresponding to a favorite tag "yakiniku" of the distributor is illustrated. The viewer can select the emote image EM displayed in the window by clicking or tapping to introduce the image onto a video content display screen.

Video data distributed in real-time, data for displaying a comment, and emotion video data for distribution can be combined and displayed in the viewer terminal 40. The generating part 23 combines video data for distribution, data for displaying a comment, and emotion video data for distribution in advance, and this may be distributed to the viewer terminal by the distributing part 24.

Figure 8:
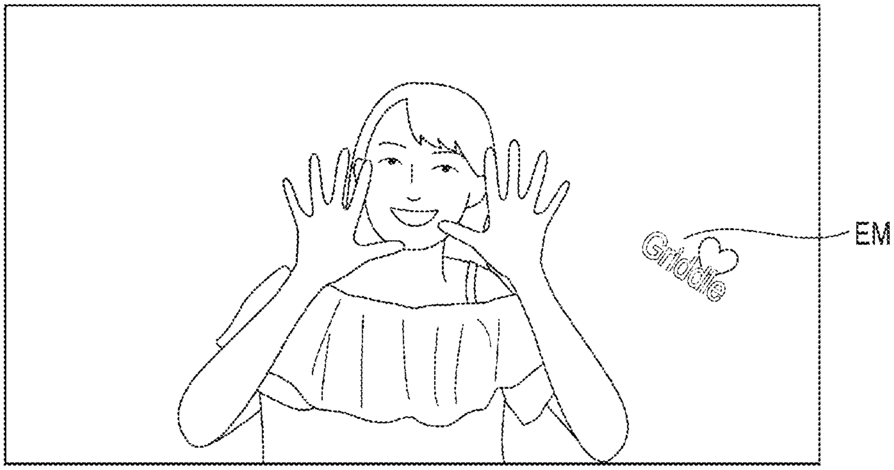
FIG. 8 is a diagram illustrating an example of a state in which an emote image is input on a display screen of video content according to Embodiment 1.

FIG. 8 is a diagram illustrating an example of a state in which an emote image is introduced on a video content display screen.

For example, when the viewer selects an emote image EM on which "griddle" is noted, the generating part 23 can generate video data for distribution such that the emote image EM is introduced on the video content display screen being broadcast. Emote images EM have animation thereof defined for each image, are guided off the display screen after performing a prescribed action on the display screen, or are set up to slowly disappear.

Operation of the emote image EM can be determined by, for example, performing a physical calculation of motion, collision, fluid, or the like obtained by the laws of classical mechanics (mass, speed, friction, wind) and the like in the generating part 23 of the video distribution device 20. For example, the generating part 23 can calculate an operation of the emote image EM based on laws of physics using a value of mass, weight, modulus of elasticity, hardness, coefficient of surface friction, hardness, or the like set for each emote image EM.

The generating part 23 can generate video data for distribution such that, after the emote image EM remains on the screen for a prescribed amount of time, the emote image EM may be guided out of a display region, gradually disappear, or the like. The generating part 23 may adjust the prescribed amount of time until the emote image EM ceases to be displayed on the screen based on a number of emote images EM introduced into the content video per unit time.

In addition, if the number of emote images EM introduced to the video content per unit time exceeds a prescribed threshold, the generating part 23 may thin out the emote images EM for display. As described above, adjusting the period of time during which the emote image EM is displayed, or the number displayed can eliminate viewers being prevented from viewing video content. The generating part 23 can suppress a number of emote images EM entered per a set number of seconds and a number of emote images EM remaining on the display screen for video content in the viewer terminal 40.

Additionally, the generating part 23 can position a transparent obstruction unrecognizable to the viewer on the display screen for video content and guide the emote image EM to a region outside or to a periphery of the screen so as to not prevent viewing of the video content. For example, by arranging a transparent object on the screen as an obstruction of the emote image EM, the generating part 23 may incline a bottom portion where the emote image EM falls onto that is slanted with respect to the horizontal axis. In this manner, for example, an emote image EM that falls from an upper portion of the screen to the bottom portion can be guided out of the screen by rolling or sliding down the transparent object.

In addition, for example, the generating part 23 may arrange the transparent object in the center of the screen as the emote image EM obstruction. Thereby, the emote image EM falling from the upper portion of the screen to the bottom or an emote image EM thrown onto the screen can be kept from crossing the center of the screen, and an emote image EM extending from the bottom of the screen toward the upper portion can be kept from reaching the center of the screen. Therefore, the emote image EM can eliminate preventing of viewers from viewing video content.

The generating part 23 may, for example, allow a viewer registering a favorite tag in common with a distributor to introduce an emote image EM corresponding to this favorite tag. In addition, the generating part 23 may set a number of emote images that can be introduced for each viewer and further, change a number of emote images EM that can be introduced depending on the level of the viewer.

Introducing the emote image EM corresponding to the favorite tag onto the display screen for video content enables communication through interests or preferences in common between the distributor and the viewer and thus excitement for video content distributed in real-time can be increased.

In addition, the generating part 23 compares the favorite tag information associated with the distributor and the favorite tag information associated with the viewer, and when there is a favorite tag in common, can generate notifying means for providing notification on the watch page that the viewer to which the favorite tag in common is attached has started viewing. Note that in the video distribution device 20 according to the present Embodiment, no information specific to a viewer is included in the notifying means displayed on the watch window to respect the anonymity of the viewer.

Specifically, the generating part 23 may generate, for example, notifying means for displaying side-by-side on-screen text A9 "One person from the broadcaster preference "yakiniku" has entered" in the area A6 for displaying comments, and may generate, for example, on-screen text A10 "One person from the broadcaster preference "yakiniku" has entered" as notifying means in the display area A5 for video content. Note that the generating part 23 may generate the video data for distribution such that both the on-screen text A9 and the on-screen text A10 are displayed, and may generate video data for distribution such that at least one of the on-screen text A9 and on-screen text A10 is displayed.

Notifying the distributor of the presence of the viewer to which the favorite tag in common is attached (and another viewer) enables the distributor to develop a broadcast with content that takes the preferences of the viewer into consideration, and increased excitement in video content distributed in real-time can be anticipated.

Note that the generating part 23 may periodically confirm favorite tags for the video content attached to the viewer and may generate statistical data (for example, viewers for a favorite tag A compose C ○%, viewers for a favorite tag B compose Δ%, . . . or the like). The generating part 23 may, for example, calculate during or after distribution of video content in real-time the ratio of favorite tags attached to video content viewers and viewers attached to that favorite tag, and, for example, present this to the distributor by displaying on the watch page or the like. Having an understanding of the types of viewers viewing their video content allows distributors to consider video content that will increase excitement in the video content.

The generating part 23 may generate, for example, a community page for presenting information of a user to which a favorite tag in common is attached.

Figure 9:
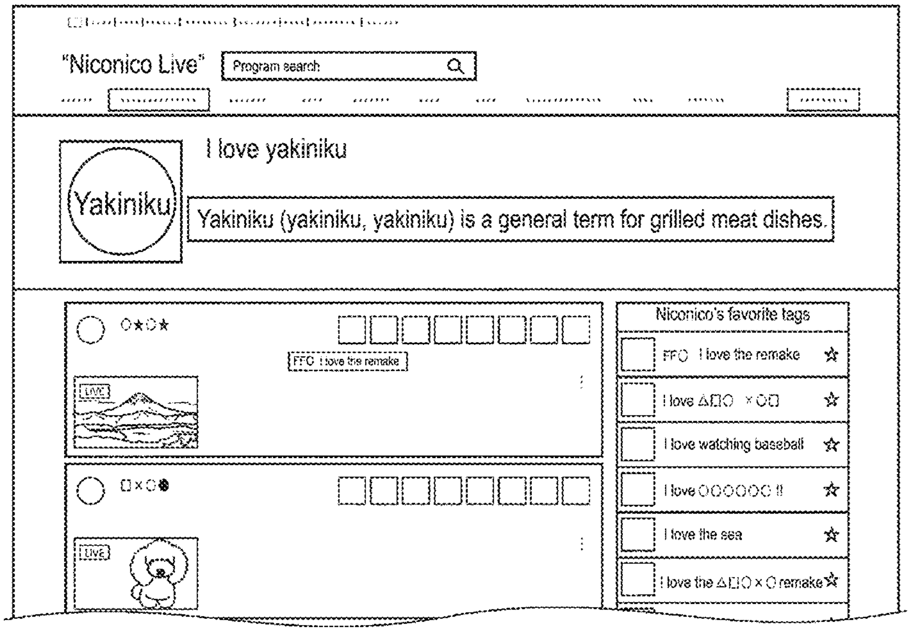
FIG. 9 is a diagram schematically illustrating an example of a community page presenting user information to which a favorite tag in common is attached according to Embodiment 1.

FIG. 9 is a diagram schematically illustrating an example of a community page presenting user information to which a favorite tag in common is attached.

Here, an example is illustrated of a community page presenting information of a user to which the favorite tag in common "yakiniku" is attached. The community page can display a favorite tag icon and at least a portion of dictionary information for the favorite tag. The favorite tag icon may be configured such that the icon can be set from a user terminal by the user to which the favorite tag is attached.

For example, in the community page, the generating part 23 may position side-by-side: user information such that a user having a greater number of favorite tags in common with a person browsing ranks higher, user information such that a user distributing video content in real-time ranks higher, or user information such that a user having a greater number of followers ranks higher. The generating part may also allow the person browsing to switch a user arrangement order.

A person browsing a community page can easily find a user that aligns with their interests or preferences from within presented user information. This allows a distributor and a viewer whose interests or preferences align to be matched in advance even during a period when a video is not being distributed in real-time, and can be anticipated to increase excitement in video content.

In addition, even during a period when video content is not being broadcast in real-time, the generating part 23 may generate a page from which users who have registered a favorite tag in common can communicate using a chat function or the like. For example, lively chats between a plurality of users including distributors and viewers allows distributors to increase their followers which it is believed leads to increased excitement in the real-time video content of the distributors.

The distributing part 24 communicably connects to the network, receives video data for distribution from the generating part 23, and distributes such to the viewer terminal 40 in response to a delivery request. The distributing part 24 is controlled by the distribution controller 22, for example, for the delivery destination or the like of the video data for distribution. For example, the viewer can view video content being broadcast by browsing a watch page of the distributor and by, for example, accessing a watch page URL in the viewer terminal 40, and can make a distribution request of the video distribution device 20.

Note, the distributing part 24 may immediately discard the video data for distribution that has been distributed but may perform buffering for a prescribed period to enable replay or slow motion playback.

Next, operation of the video distribution device according to Embodiment 1 is described.

Figure 10:
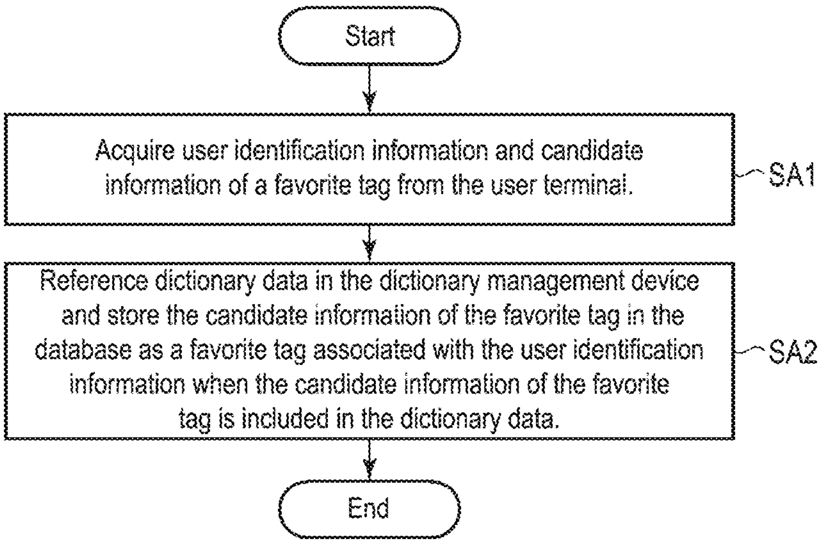
FIG. 10 is a flowchart for describing an example of an operation for registering a favorite tag for a user in the video distribution device according to Embodiment 1.

FIG. 10 is a flowchart for describing an example of an operation for registering a favorite tag for a user in the video distribution device according to Embodiment 1.

The third acquiring part 213 of the video distribution device 20 acquires user identification information and candidate information of a favorite tag from the user terminal (from the distributor terminal 10 and the viewer terminal 40) (step SA1). The third acquiring part 213 transmits the acquired information to the user information managing part 25.

The user information managing part 25 can associate the favorite tag candidate information with the user identification information and store in the database 26 with reference to the dictionary of the dictionary management device 30 when the favorite tag candidate is included in the dictionary data (step SA2).

Note that when the acquired candidate information of the favorite tag is not included in the dictionary data, the user information managing part 25 can present a word similar to the candidate information of the favorite tag contained in the dictionary data on the user terminal.

Figure 11:
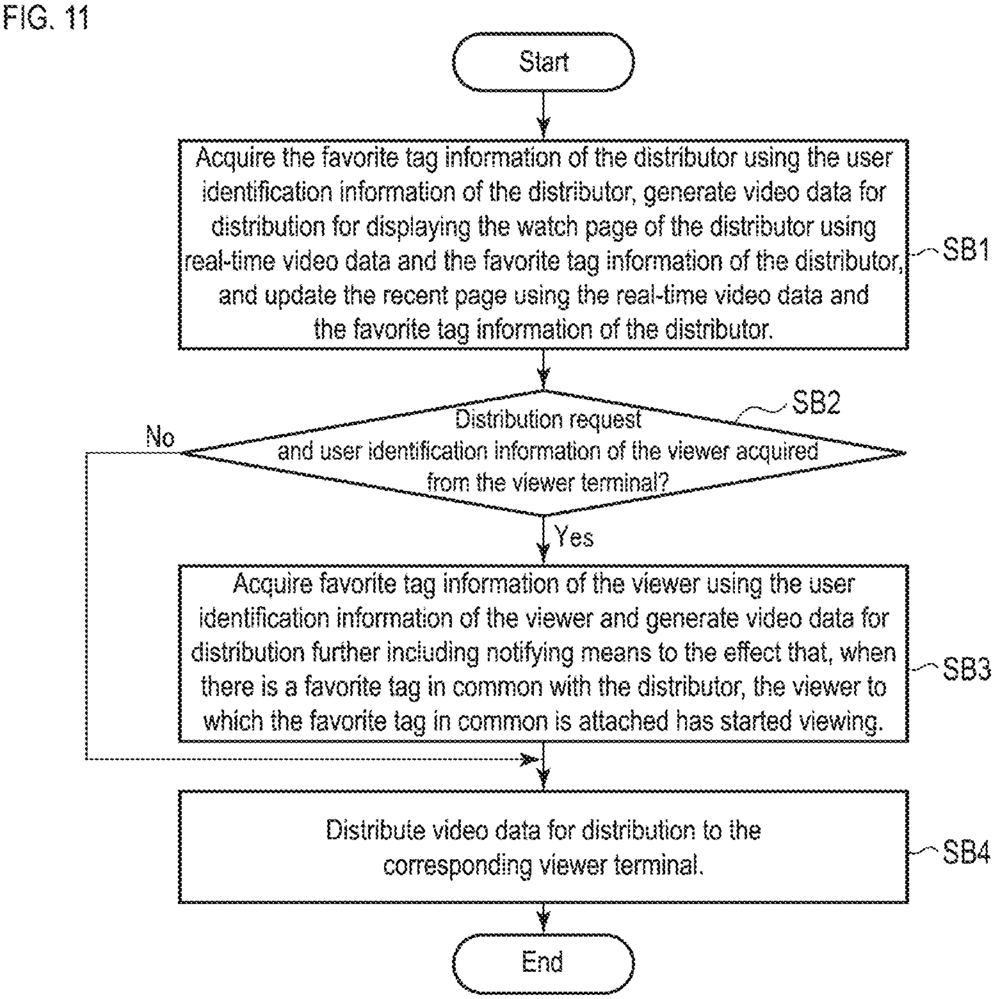
FIG. 11 is a flowchart for describing an example of an operation for distributing video content for a live broadcast in the video distribution device according to Embodiment 1.

FIG. 11 is a flowchart for describing an example of an operation for distributing video content for a live broadcast in the video distribution device according to Embodiment 1.

The first acquiring part 211 acquires real-time video data and user identification information of the distributor from the distributor terminal 10 and transmits such to the generating part 23.

The generating part 23 acquires the favorite tag information of the distributor via the user information managing part 25 using the user identification information of the distributor. The generating part 23 generates video data for distribution for displaying the watch page of the distributor using real-time video data and the favorite tag information of the distributor and updates a recent page using the real-time video data and the favorite tag information of the distributor (step SB1).

When the distribution request and the user identification information of the viewer are acquired from the viewer terminal 40, the second acquiring part 212 transmits the user identification information of the viewer to the generating part 23 (step SB2).

The generating part 23 acquires the favorite tag information of the viewer via the user information managing part 25 using the user identification information of the viewer. The generating part 23 compares the favorite tag information of the distributor and the favorite tag information of the viewer, and when there is a favorite tag in common, generates video data for distribution further including notifying means to the effect that a viewer to which to the favorite tag in common is attached has started viewing, and transmits such to the distributing part 24 (step SB3).

The distributing part 24 distributes the video data for distribution generated in step SB1 or step SB3 to the corresponding viewer terminal 40 based on control of the distribution controller 22 (step SB4).

When real-time video data is being acquired from the distributor terminal 10, the video distribution device 20 periodically performs steps SB1 to SB4 and distributes real-time video content.

As described above, according to the present Embodiment, managing favorite tags depending on interests and preferences and the user information attached to each user can facilitate the matching of viewers and distributors, resulting in the ability to provide a video distribution device, a video distribution method, and recording media for providing a service that enables active communication between distributors and viewers and enlivens the video content.

Embodiment 2

A video distribution device, a video distribution method, and recording media according to Embodiment 2 are described below with reference to the drawings. Similar to Embodiment 1, Embodiment 2 registers a favorite tag of a user and distributes video content. Embodiment 2 differs from Embodiment 1 in that, for example, a recommendation page is generated for displaying recommended distributors based on the favorite tag of the user. In Embodiment 2, the third acquiring part 213 is an example of an information acquiring part.

Configurations similar to Embodiment 1 are given the same code and description thereof is omitted. For Embodiment 2, mainly portions different from those of Embodiment 1 are described.

Figure 12:
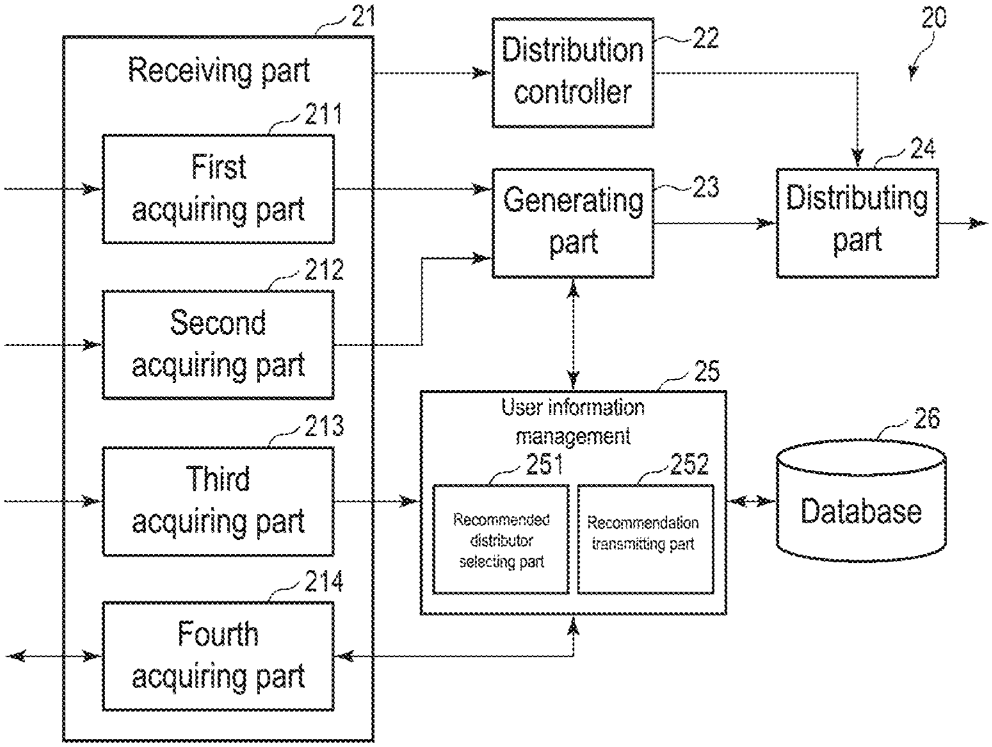
FIG. 12 is a block diagram schematically illustrating a configuration example of the video distribution device according to Embodiment 2.

FIG. 12 is a block diagram schematically illustrating a configuration example of the video distribution device according to Embodiment 2.

The video distribution device 20 is provided with a receiving part 21 including a first acquiring part 211, a second acquiring part 212, a third acquiring part 213, and a fourth acquiring part 214; a distribution controller 22; a generating part 23; a distributing part 24; a user information managing part 25; and a database 26. The user information managing part 25 is provided with a recommended distributor selecting part 251 and a recommendation transmitting part 252. Note that the recommended distributor selecting part 251 and the recommendation transmitting part 252 may be independent of the user information managing part 25.

The video distribution device 20 may be provided with, for example, a processor for executing a program that implements a function of the above configuration and memory on which the program is stored. The processor is typically a CPU (Central Processing Unit) and/or GPU (Graphics Processing Unit), but may also be, for example, a microcontroller, FPGA (Field Programmable Gate Array), DSP (Digital Signal Processor), or the like. In addition, the memory temporarily stores the program executed by the processor, data used by this processor, and the like, for implementing operation of the video distribution device.

The video distribution device 20 may be further provided with a communicating part (not shown) that can connect to the network and a data storing part (not shown) for compiling a large amount of data. The data storing part may include the database 26. The data storing part may be built into the video distribution device 20 or attached externally to the video distribution device 20. The data storing part may include non-volatile storage media such as a HDD (Hard Disk Drive), SSD (Solid State Drive), and the like.

The recommended distributor selecting part 251 selects one or a plurality of distributors as a recommended distributor based on stored favorite tag information associated with the user identification information of a viewer. The recommended distributor indicates a distributor recommended to the viewer based on a favorite tag of the viewer. The recommended distributor includes, for example, a distributor recommended based on a matching aspect with the favorite tag of the viewer. The matching aspect includes, for example, a high degree of matching with the favorite tag or a high matching tendency with the favorite tag. The recommended distributor includes a distributor for which a favorite tag in common with the favorite tag of the viewer is registered.

According to this example, the recommended distributor selecting part 251 does not require operation by the distributor, and matching can be performed based on a favorite tag of the distributor and the viewer. As a result, the video distribution device 20 can provide the viewer terminal 40 with a matching result using the recommended distributor selecting part 251. In this manner, the viewer can easily find a distributor having aligning interests or preferences. This can be expected to improve the frequency at which the video content of the distributor having aligning interests or preferences is viewed by viewers, and increase excitement in video content.

The recommended distributor selecting part 251 selects, for example, one or a plurality of distributors as the recommended distributor depending on the matching aspect of the favorite tag information associated with the viewer and the favorite tag information associated with a distributor.

According to this example, the recommended distributor selecting part 251 can perform matching based on the matching aspect of the favorite tags of the distributor and the viewer. As a result, the video distribution device 20 can provide the viewer terminal 40 with a matching result depending on the matching aspect of the favorite tag using the recommended distributor selecting part 251. This allows viewers to easily find a distributor that aligns with their interests or preferences based on a favorite tag in common. This can be expected to improve the frequency at which the video content of the distributor having aligning interests or preferences is viewed by viewers, and increase excitement in video content.

The matching aspect may be the degree of matching. In this case, the recommended distributor selecting part 251 compares the favorite tag information associated with the viewer and the favorite tag information associated with the distributor to acquire a number of favorite tags in common as the degree of matching. The degree of matching can be set higher with increased number of favorite tags in common. The recommended distributor selecting part 251 selects as the recommended distributor one or a plurality of distributors depending on the degree of matching. For example, the recommended distributor selecting part 251 may select recommended distributors in descending order from a distributor having a highest degree of matching.

According to this example, the recommended distributor selecting part 251 can perform matching based on the degree of matching of the favorite tag of the distributor and the viewer. As a result, the video distribution device 20 can provide the viewer terminal 40 with a matching result depending on the degree of matching in the favorite tags using the recommended distributor selecting part 251. This allows the viewer to easily find a more compatible distributor, such as a distributor having a large number of favorite tags in common. This can be expected to improve the frequency at which the video content of the distributor having aligning interests or preferences is viewed by viewers, and increase excitement in video content.

The matching aspect may be the matching tendency. In this case, the recommended distributor selecting part 251 compares the favorite tag information associated with the viewer and the favorite tag information associated with the distributor to acquire as the matching tendency a distributor having a particular favorite tag in common. The specific favorite tag includes, for example, a rare favorite tag having a low number of registered users, a most recent favorite tag having a short amount of time elapsed since being registered, or the like. The matching tendency includes a registered number of users for a specific favorite tag, an elapsed amount of time since registration for the specific favorite tag, or the like. The matching tendency can be, for example, higher for a lower number of registered users for the specific favorite tag, or higher for a lower amount of elapsed time since the specific favorite tag was registered. The recommended distributor selecting part 251 selects as the recommended distributor one or a plurality of distributors depending on the matching tendency. For example, the recommended distributor selecting part 251 may select recommended distributors in descending order from a distributor having a highest matching tendency.

According to this example, the recommended distributor selecting part 251 can perform matching based on the matching tendency of the favorite tag of the distributor and the viewer. As a result, the video distribution device 20 can provide the viewer terminal 40 with a matching result depending on the matching tendency of the favorite tag using the recommended distributor selecting part 251. This allows the viewer to easily find a more compatible distributor, such as a distributor having a rare favorite tag in common. This can be expected to improve the frequency at which the video content of the distributor having aligning interests or preferences is viewed by viewers, and increase excitement in video content.

The recommended distributor selecting part 251 may select one or a plurality of distributors from among all distributors as a recommended distributor based on favorite tag information associated with the viewer. A11 distributors includes distributors currently distributing live broadcast video content and distributors other than distributors broadcasting live. In this case, the recommended distributor selecting part 251 selects one or a plurality of distributors as the recommended distributor based on the favorite tag information associated with the viewer and the favorite tag information of all distributors.

According to this example, the recommended distributor selecting part 251 can perform matching based on a matching tendency of a favorite tag of all distributors and the viewer. As a result, the video distribution device 20 can provide the viewer terminal 40 with a matching result for all distributors using the recommended distributor selecting part 251. This allows the viewer to easily find a distributor that aligns with their interests or preferences based on video content information being currently distributed by the recommended distributor and video content information previously distributed by the recommended distributor. This can be expected to improve the frequency at which the video content of the distributor having aligning interests or preferences is viewed by viewers, and increase excitement in video content.

The recommended distributor selecting part 251 may select one or a plurality of distributors from among distributors performing live broadcasts as a recommended distributor based on favorite tag information associated with the viewer. In this case, the recommended distributor selecting part 251 selects one or a plurality of distributors as the recommended distributor based on the favorite tag information associated with the viewer and the favorite tag information of the distributors performing live broadcast.

According to this example, the recommended distributor selecting part 251 can perform matching based on a matching tendency of a favorite tag of the distributors performing live broadcast and the viewer. As a result, the video distribution device 20 can provide the viewer terminal 40 with a matching result for the distributors performing live broadcasts using the recommended distributor selecting part 251. This allows the viewer to easily find a distributor that aligns with their interests or preferences based on video content information currently being distributed by the recommended distributor. This can be anticipated to improve the frequency at which video content of the distributors performing live broadcasts and having aligning interests or preferences is viewed by viewers, and increase excitement in video content.

Note that the recommended distributor selecting part 251 may select a recommended distributor other than a specific distributor. For example, the recommended distributor selecting part 251 may select a recommended distributor other than a distributor where they follow each other. According to this example, the video distribution device 20 can recommend a new distributor that the viewer does not follow. Therefore, the viewer can view video content of a new distributor that aligns with their interests or preferences, and the video distribution device 20 can activate communication between the viewer and the distributor.

The recommended distributor selecting part 251 may select one or a plurality of distributors as the recommended distributor, for example, when the user has accessed a video distribution site or logged in to the video distribution site, when the user registers as a member on the video distribution site or requests editing of favorite tag registration information, or the like. Note that the recommended distributor selecting part 251 can be configured to enable communication with the third acquiring part 213 or a user terminal in which handling is performed via a communicating part (not shown).

The recommendation transmitting part 252 transmits recommended distributor information selected by the recommended distributor selecting part 251 to the viewer terminal 40. The recommendation transmitting part 252 may transmit the recommended distributor information to the generating part 23 in response to a request from the generating part 23.

The generating part 23 can acquire recommended distributor information via the recommendation transmitting part 252 and generate a recommendation page presenting the recommended distributor information to the viewer. The generating part 23 can generate the recommendation page for each viewer.

Figure 13:
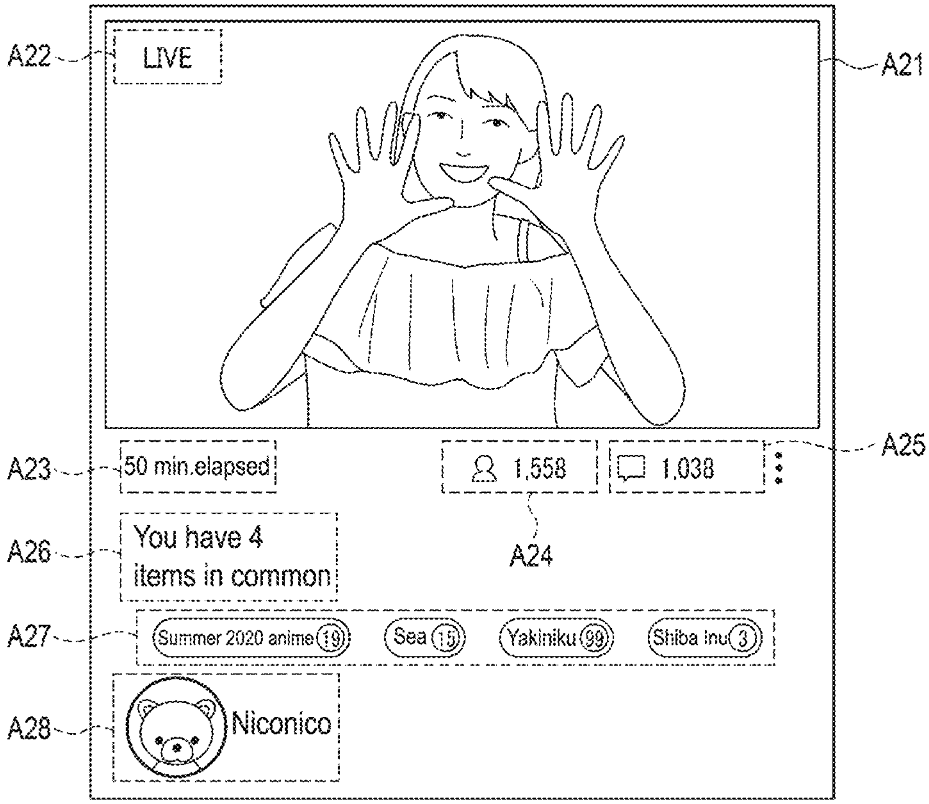
FIG. 13 is a diagram schematically illustrating an example of a recommended distributor window showing information on recommended distributors included in the recommendation page according to Embodiment 2.

FIG. 13 is a diagram schematically illustrating an example of a recommended distributor window showing information on recommended distributors included in the recommendation page. The recommendation page can include a plurality of recommended distributor windows. The number of recommended distributor windows may be set in advance, and may be set in response to a number of recommended distributors selected by the recommended distributor selecting part 251.

The generating part 23 can generate a recommendation page each time a recommended distributor is selected by the recommended distributor selecting part 251. The generating part 23 can generate the recommendation page, for example, when the user has accessed a video distribution site or logged in to the video distribution site, when the user registers as a member on the video distribution site or requests editing of favorite tag registration information, or the like.

In the example illustrated in FIG. 13, the recommended distributor window includes at least an area A21 for displaying video content, an area A22 for displaying video content status, an area A23 for displaying time, an area A24 for displaying a number relating to video content, an area A25 for displaying a number relating to viewer content, an area A26 for displaying a matching aspect of a favorite tag, an area A27 for displaying a favorite tag in common, and an area A28 for displaying information identifying a recommended distributor.

Video content displayed in the area A21 can include, for example, a thumbnail of video content, a still image of the video content at a point in time, or the like. The area A22 may be a text display such as "LIVE", which shows that video content is broadcast live. The video content status can include live broadcast, post-broadcast, pre-broadcast, and the like. The area A23 can include an amount of time elapsed from when real-time distribution has started, an amount of time until real-time distribution starts, or the like. The area A24 can include a number of viewers of video content, a number of registrants of the video content, a number of followers for a distributor, or the like. The area A25 can include a number of comments posted by a viewer of video content and the like. The area A26 can include a degree of matching or a matching tendency for a favorite tag of a viewer and a distributor. The area A27 can include a favorite tag in common, a number of registrants of a favorite tag, and the like. The area A28 can include, for example, an icon identifying a distributor and name of the distributor.

The recommended distributor window can include, in addition to the information described above, information such as a title of the video content and a favorite tag other than a favorite tag in common registered by a distributor.

FIG. 13 illustrates a display example of the recommended distributor window when "summer 2020 anime", "sea", "yakiniku", and "Shiba Inu" are registered as favorite tags of the viewer. In this case, the generating part 23 generates a recommendation page illustrating information on a recommended distributor selected by the recommended distributor selecting part 251. A distributor having "summer 2020 anime", "sea", "yakiniku", and "Shiba Inu" registered as favorite tags is selected by the recommended distributor selecting part 251 as a recommended distributor. The generating part 23 generates the recommended distributor window showing the distributor information selected as the recommended distributor. In this example, the area A26 indicates as the degree of matching for the favorite tags of the viewer and the distributor with "4" for the number of favorite tags in common. The generating part 23 may position recommended distributor windows side-by-side such that a distributor having a greater number of favorite tags in common between the viewer and the distributor ranks higher, and may position recommended distributor windows side-by-side such that a distributor distributing video content in real-time ranks higher. The positioning order of the recommended distributor windows may be allowed to be switched according to an operation of the viewer. Note that when a recommended distributor is selected by the recommended distributor selecting part 251 in response to a matching tendency of a favorite tag, the generating part 23 may arrange the recommended distributor windows side-by-side such that a distributor having a higher matching tendency ranks higher. For example, in the case of a rare favorite tag in which a number of registered users for "Shiba Inu" is low, the generating part 23 may position the recommended distributor windows side-by-side such that a distributor for which "Shiba Inu" is registered as a favorite tag ranks higher. Note that when a recommended distributor is selected by the recommended distributor selecting part 251 from distributors performing live broadcasting, the generating part 23 may arrange the recommended distributor windows side-by-side depending on an elapsed amount of time since real-time distribution was started. Note that the generating part 23 may arrange the recommended distributor windows side-by-side such that a distributor that the viewer follows ranks higher or lower.

A person browsing the recommendation page can easily find a user with matching interests or preferences based on the recommended distributor window without having to perform an operation of searching for users who have registered a common favorite tag. This can be expected to improve the frequency at which the video content of the distributor having aligning interests or preferences is viewed by viewers, and increase excitement in video content.

The generating part 23 may periodically update the generated recommendation page and upload such onto the network. The viewer terminal 40 can access the recommendation page via the network. The viewer can browse information on a recommended distributor with matching interests or preferences based on registered favorite tags and can select and view video content from the recommended distributor.

Next, operation of the video distribution device according to Embodiment 2 is described.

Figure 14:
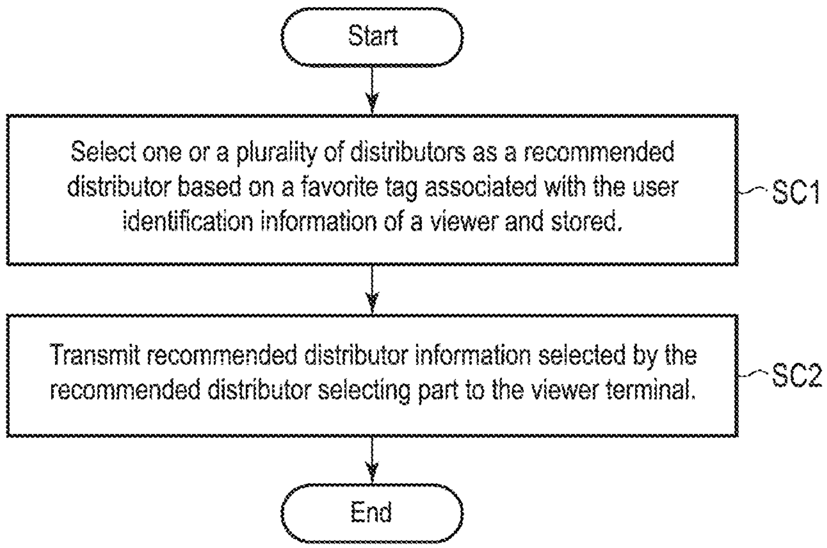
FIG. 14 is a flowchart for describing an example of an operation for distributing recommended distributor information in the video distribution device according to Embodiment 2.

FIG. 14 is a flowchart for describing an example of an operation for transmitting recommended distributor information in the video distribution device according to Embodiment 2.

As a premise for the following operations, the video distribution device 20 performs an operation of registering a favorite tag similar to Embodiment 1.

The first acquiring part 211 of the video distribution device 20 acquires real-time video data and user identification information of the distributor from the distributor terminal 10 and transmits such to the recommended distributor selecting part 251.

The second acquiring part 212 acquires the user identification information of a viewer from the viewer terminal 40 and transmits such to the recommended distributor selecting part 251.

The recommended distributor selecting part 251 acquires the favorite tag information of a distributor associated with the user identification information of the distributor from the database 26 using the user identification information of the distributor. The recommended distributor selecting part 251 acquires the favorite tag information of a viewer associated with the user identification information of the viewer from the database 26 using the user identification information of the viewer. The recommended distributor selecting part 251 selects one or a plurality of distributors as a recommended distributor based on the favorite tag information of the viewer (step SC1).

The recommendation transmitting part 252 transmits recommended distributor information selected by the recommended distributor selecting part 251 to the viewer terminal 40 (step SC2). The recommendation transmitting part 252 may transmit the recommended distributor information selected by the recommended distributor selecting part 251 to the generating part 23 in response to a request from the generating part 23. In this case, the generating part 23 may transmit a recommendation page generated based on the information of the recommended distributor to the viewer terminal 40.

When real-time video data is acquired from the distributor terminal 10, the video distribution device 20 may periodically perform steps SC1 to SC2. The video distribution device 20 may perform steps SC1 to SC2 in response to an operation of the viewer on the viewer terminal 40. For example, the video distribution device 20 may perform steps SC1 to SC2 when the user has accessed a video distribution site or logged in to the video distribution site, when the user registers as a member on the video distribution site or requests editing of favorite tag registration information, or the like.

As described above, according to the present Embodiment, the video distribution device 20 manages user information by attaching a favorite tag to each user depending on their interests or preferences, and can thereby easily match a distributor and a viewer. Furthermore, the video distribution device 20 can provide the viewer terminal with a matching result between the viewer and the distributor without requiring an operation of the viewer. As a result, a distributor having matching interests or preferences can be easily found and this can improve the follow rate of a favorite tag. In addition, communication triggered by a favorite tag between a viewer and a distributor can be promoted and a posting rate or acquisition rate of comments by viewers can be improved. In this manner, the video distribution device 20 can provide a video distribution device, video distribution method, and recording media for providing a service that enables active communication between viewers and distributors and increases excitement for video content.

Furthermore, according to the present Embodiment, the video distribution device 20 can provide the viewer terminal with a matching result between the viewer and the distributor. Thus, the video distribution device 20 can increase opportunities for viewers to view a variety of video content and improve a turnover rate or viewing frequency.

MODIFIED EXAMPLE

Note that Embodiment 2 may include a modified example such as the following.

In step SC1, the recommended distributor selecting part 251 selects one or a plurality of viewers as a recommended viewer based on stored favorite tag information associated with the user identification information of a distributor. The recommended viewer indicates a distributor recommended to the distributor based on a favorite tag of the distributor. The recommended viewer includes a distributor recommended based on a matching aspect of the favorite tag of the distributor. The recommended viewer includes a viewer for which a favorite tag in common with the favorite tag of the distributor is registered. In this case, the recommended distributor selecting part 251 acquires favorite tag information of a viewer associated with the user identification information of the viewer from the database 26 using the user identification information of the viewer. The recommended distributor selecting part 251 acquires the favorite tag information of a distributor associated with the user identification information of the distributor from the database 26 using the user identification information of the distributor. The recommended distributor selecting part 251 compares the favorite tag information associated with the viewer and the favorite tag information associated with the distributor to select one or a plurality of viewers as the recommended viewer depending on a matching aspect of a favorite tag.

In step SC2, the recommendation transmitting part 252 transmits information of the recommended viewer selected by the recommended distributor selecting part 251 to the distributor terminal 10. The recommendation transmitting part 252 may transmit the information of the recommended viewer selected by the recommended distributor selecting part 251 to the generating part 23 in response to a request from the generating part 23. In this case, the generating part 23 may transmit a recommendation page generated based on the information of the recommended viewer to the distributor terminal 10.

According to this example, the video distribution device 20 can provide the distributor terminal with a matching result between the distributor and the viewer without requiring operation of the distributor. As a result, the distributor can distribute video content depending on interests or preferences of the viewer. Therefore, a video distribution device, a video distribution method, and recording media for providing a service that enables active communication between viewers and distributors and increases excitement for video content can be provided.

In step SC1, the recommended distributor selecting part 251 selects one or a plurality of viewers and distributors as a matching user based on the favorite tag information associated with the user identification information of a distributor and stored and the favorite tag information associated with the user identification information of a viewer and stored. The matching user indicates a viewer and a distributor matched based on a favorite tag of the viewer and the distributor. Matching users include, for example, a distributor associated with a favorite tag for which the degree of matching or matching tendency with a favorite tag of the viewer is high, or a viewer associated with a favorite tag for which the degree of matching or matching tendency with a favorite tag of the distributor is high. The matching user includes a user for which a favorite tag in common is mutually registered. In this case, the recommended distributor selecting part 251 acquires favorite tag information of a viewer associated with the user identification information of the viewer from the database 26 using the user identification information of the viewer. The recommended distributor selecting part 251 acquires the favorite tag information of a distributor associated with the user identification information of the distributor from the database 26 using the user identification information of the distributor. The recommended distributor selecting part 251 compares the favorite tag information associated with the viewer and the favorite tag information associated with the distributor to select one or a plurality of viewers and distributors as the matching user depending on a matching aspect of the favorite tag.

In step SC2, the recommendation transmitting part 252 transmits information of the matching user selected by the recommended distributor selecting part 251 to at least one of the distributor terminal 10 and the viewer terminal 40. The recommendation transmitting part 252 may transmit the information of the recommended viewer selected by the recommended distributor selecting part 251 to the generating part 23 in response to a request from the generating part 23. In this case, the generating part 23 may transmit a recommendation page generated based on the information of the recommended viewer to at least one of the distributor terminal 10 and the viewer terminal 40. Note that the recommendation transmitting part 252 may transmit information of the matching user to a manager terminal (not shown). The manager terminal is a terminal used by a manager or the like who manages the video distribution device 20. The manager terminal can be configured similarly to the distributor terminal 10 or the viewer terminal 40.

According to this example, the video distribution device 20 can provide the distributor terminal, the viewer terminal, or the manager terminal with a matching result between the distributor and the viewer without requiring an operation of the distributor, viewer, or manager. As a result, the distributor, the viewer, or the manager can distribute video content depending on the interests or preferences of the distributor and the viewer. Therefore, a video distribution device, a video distribution method, and recording media for providing a service that enables active communication between viewers and distributors and increases excitement for video content can be provided.

Note that the user information managing part 25 is described as being able to associate candidate information of the favorite tag as a favorite tag with the user identification information and store this in the database 26 when candidate information of a favorite tag acquired from the user terminal is included in the dictionary data. However, the user information managing part 25 is not limited thereto. For example, when acquired candidate information of a favorite tag and a similar word or related word is included in the dictionary data, the user information managing part 25 may, for example, store a word registered by a large number of users as a favorite tag in the database 26 as a favorite tag. For example, a case is described in which the user information managing part 25 acquires an abbreviation of the word "XXXXX" or a synonym "YY" of the word from the user terminal as candidate information of the favorite tag. In this case, it is assumed that both the word "XXXXX" and the abbreviation or synonym "YY" of the word are registered in the dictionary data. When the word "YY" is associated with the word "XXXXX" and a number of users for which the word "XXXXX" is registered as a favorite tag in the dictionary data is high, the user information managing part 25 may record "XXXXX" in the database 26 as a favorite tag. This enables mismatches in favorite tags registered by a user to be suppressed and enables the user to be more efficiently classified according to their interests or preferences.

Another example is described in which the abbreviation or the synonym that is another word "YY" of the word "XXXXX" is acquired from the user terminal as the candidate information of the favorite tag. In this example, it is assumed that both the word "XXXXX" and the other word "YY" of the word are registered in the dictionary data. When the word "YY" is related to the word "XXXXX" and "XXXXX" is registered as being a correct standard expression, the user information managing part 25 may record "XXXXX" as a favorite tag in the database 26. According to this example, mismatches in favorite tags registered by a user can be suppressed and the user can be more efficiently classified according to their interests or preferences.

Still another example is described in which the abbreviation or the synonym that is another word "YY" of the word "XXXXX" is acquired from the user terminal as the candidate information of the favorite tag. In this example, it is assumed that the word "XXXXX" is registered in the dictionary data but that another word "YY", being an abbreviation or synonym of the word "XXXXX", is not registered. When the word "YY" is registered as a word related to the word "XXXXX" in the dictionary data, the user information managing part 25 may store "XXXXX" as a favorite tag in the database 26. In this manner, a word being searched for in the dictionary data may be mutually associated with a word registered in the dictionary data and rather than the favorite tag candidate information for which the user requests registration, another word that has been associated with the candidate information may be registered as the favorite tag. According to this example, mismatches in favorite tags registered by a user can be suppressed and the user can be more efficiently classified according to their interests or preferences. In addition, the amount of information in the dictionary data can be decreased without needing to register items for abbreviations or synonyms in the dictionary data. Moreover, inconsistencies in the description content and update states for both the word "XXXXX" and the other word "YY" can be prevented.

In the case that a user does not register a favorite tag, the user information managing part 25 may reference viewing history or a latest favorite tag registration ranking of the user or the like, and recommend a favorite tag that seems to match a preference of the user and encourage registration of the preference tag. In this case as well, the user information managing part 25 preferably presents, from among the words registered in the dictionary of the dictionary management device 30, recommendations to the user as favorite tags. According to this example, the user information managing part 25 can encourage the user to register a favorite tag and, based on the favorite tag registered accordingly, the recommended distributor selecting part 251 can select a recommended distributor. Therefore, the video distribution device 20 can provide a service that makes for more active communication between a viewer and a distributor and increases excitement in video content.

The recording media is a non-temporal, tangible media. The recording media is a computer-readable media. The recording media may be any media such as a CD-ROM, memory card, or the like on which a program can be stored, and which can be read by a computer.

Note, the present invention is not limited to the Embodiments described above and various modifications can be made at the implementation stage without departing from the scope of the present invention. In addition, suitable combinations of the various Embodiments can be made and various combined effects can be obtained. Furthermore, various inventions are included in the Embodiments described above and various inventions can be extracted through selecting and combining a plurality of disclosed configuration elements. For example, if in the case of some configuration elements being deleted from all of the configuration elements indicated in the Embodiments, a problem is resolved and an effect is obtained, the configuration with these configuration elements deleted can be extracted as an invention.

EXPLANATION OF CODES

10. Distributor terminal, 20. Video distribution device, 21. Receiving part, 22. Distribution controller, 23. Generating part, 24. Distributing part, 25. User information managing part, 26. Database, 30. Dictionary management device, 40. Viewer terminal, 211. First acquiring part, 212. Second acquiring part, 213. Third acquiring part, 214. Fourth acquiring part, 251. Recommended distributor selecting part, 252. Recommendation transmitting part, A1, A2. Button, A3-A8, A21-A28. Area, A9, A10. On-screen text (notifying means), A11, A12. Input means, DG1, DG2. Dialogue

The invention claimed is:

1. A method for operating a viewer terminal used by a viewer, comprising:

receiving, from the viewer, an operation for associating the viewer with one or more favorite tags of the viewer;

transmitting a video distribution request;

receiving data for displaying a video corresponding to the video distribution request, the data including viewer-inputted comments input for the video; and displaying a screen including the video, wherein when (1) a first viewer favorite tag associated with the viewer or a second viewer favorite tag associated with a second viewer of another terminal device that transmitted the video distribution request for the video matches (2) a first distributor favorite tag associated with a distributor of the video, then the data includes information for displaying the first viewer favorite tag or second viewer favorite tag that matches the first distributor favorite tag, and displaying the first distributor favorite tag on the screen with the video.

2. The method according to claim 1 further comprising displaying the first distributor favorite tag only in a position vertically aligned with the viewer-inputted comments on the screen.

3. The method according to claim 1 further comprising displaying the first distributor favorite tag in only one location on the screen.

4. The method according to claim 1 further comprising displaying the viewer-inputted comments and the first distributor favorite tag in vertical alignment.

5. A system comprising:

a first acquiring part configured to receive, from a viewer of a first terminal device, an operation for associating the viewer with one or more favorite tags of the viewer;

a second acquiring part configured to transmit a video distribution request; and a generating part configured to receive data for displaying a video corresponding to the video distribution request, the data including viewer-inputted comments input for the video, and configured to display a screen including the video, wherein when (1) a first viewer favorite tag associated with the viewer or a second viewer favorite tag associated with a second viewer of a second terminal device that transmitted the video distribution request for the video matches (2) a first distributor favorite tag associated with a distributor of the video, then the data includes information for displaying the first viewer favorite tag or second viewer favorite tag that matches the first distributor favorite tag, and the generating part is configured to display the first distributor favorite tag on the screen with the video.

6. The system according to claim 5 wherein the generating part is further configured to display the first distributor favorite tag only in a position vertically aligned with the viewer-inputted comments on the screen.

7. The system according to claim 5 wherein the generating part is further configured to display the first distributor favorite tag in only one location on the screen.

8. The system according to claim 5 wherein the generating part is further configured to display the viewer-inputted comments and the first distributor favorite tag in vertical alignment.

9. A viewer terminal configured to:

receive from a viewer, comments inputted by the viewer in response to a video; and display a screen including the video and a first distributor favorite tag;

wherein the viewer is associated with one or more favorite tags of the viewer, wherein the video corresponds to a video distribution request, and wherein when (1) a first viewer favorite tag associated with the viewer or a second viewer favorite tag associated with a second viewer of another terminal device that transmitted the video distribution request for the video matches (2) a first distributor favorite tag associated with a distributor of the video, the data includes information for displaying the first viewer favorite tag or second viewer favorite tag that matches the first distributor favorite tag.

10. The viewer terminal according to claim 9 further configured to display the first distributor favorite tag only in a position vertically aligned with the viewer-inputted comments on the screen.

11. The viewer terminal according to claim 9 further configured to display the first distributor favorite tag in only one location on the screen.

12. The viewer terminal according to claim 9 further configured to display the viewer-inputted comments and the first distributor favorite tag in vertical alignment.

* * * * *